(12) United States Patent
Datcuk, Jr.

(10) Patent No.: US 6,402,073 B1
(45) Date of Patent: Jun. 11, 2002

(54) FISHING REEL WITH STRIP DRAG MECHANISM

(75) Inventor: Peter T. Datcuk, Jr., Sewell, NJ (US)

(73) Assignee: Penn Fishing Tackle Manufacturing Company, Philadelphia, PA (US)

( * ) Notice: Subject to any disclaimer, the term of this patent is extended or adjusted under 35 U.S.C. 154(b) by 0 days.

(21) Appl. No.: 09/802,494

(22) Filed: Mar. 9, 2001

(51) Int. Cl.[7] ............................................. A01K 89/015
(52) U.S. Cl. ...................... 242/270; 242/260; 192/66.1; 192/70.14
(58) Field of Search ................................. 242/243, 257, 242/259, 260, 261, 262, 270, 271; 192/66.1, 66.21, 70.14

(56) References Cited

U.S. PATENT DOCUMENTS

| 3,146,966 A | * | 9/1964 | Dunn | 242/271 |
|---|---|---|---|---|
| 3,425,644 A | * | 2/1969 | Griste | 242/270 |
| 3,478,979 A | * | 11/1969 | Henze | 242/285 |
| 3,966,140 A | * | 6/1976 | Coquelet et al. | 242/271 |
| 4,516,741 A | * | 5/1985 | Hashimoto | 242/302 |
| 4,738,410 A | * | 4/1988 | Yamaguchi | 242/271 |
| 4,901,944 A | * | 2/1990 | Aoki | 242/260 |
| 5,297,756 A | * | 3/1994 | Ikuta | 242/270 |
| 5,362,010 A | * | 11/1994 | Takamatsu | 242/261 |
| 5,575,432 A | * | 11/1996 | Baisch | 242/302 |
| 5,746,381 A | * | 5/1998 | Miyazaki | 242/261 |
| 5,791,576 A | * | 8/1998 | Miyazaki | 242/261 |
| 6,045,073 A | * | 4/2000 | Ikuta | 242/260 |
| 6,152,390 A | * | 11/2000 | Datcuk, Jr. | 242/270 |

* cited by examiner

Primary Examiner—Emmanuel M. Marcelo
(74) Attorney, Agent, or Firm—Frank J. Benasutti

(57) ABSTRACT

A position is added to the drag lever travel in a lever drag reel; which position is called the "strip" drag position; and which is positioned just above the free spool position. At this position, an additional detent is added, splitting the original steep cam rise into two sections to provide a light drag setting before achieving free spool; thus preventing the operator from accidentally placing the drag lever into a free spool condition.

18 Claims, 9 Drawing Sheets

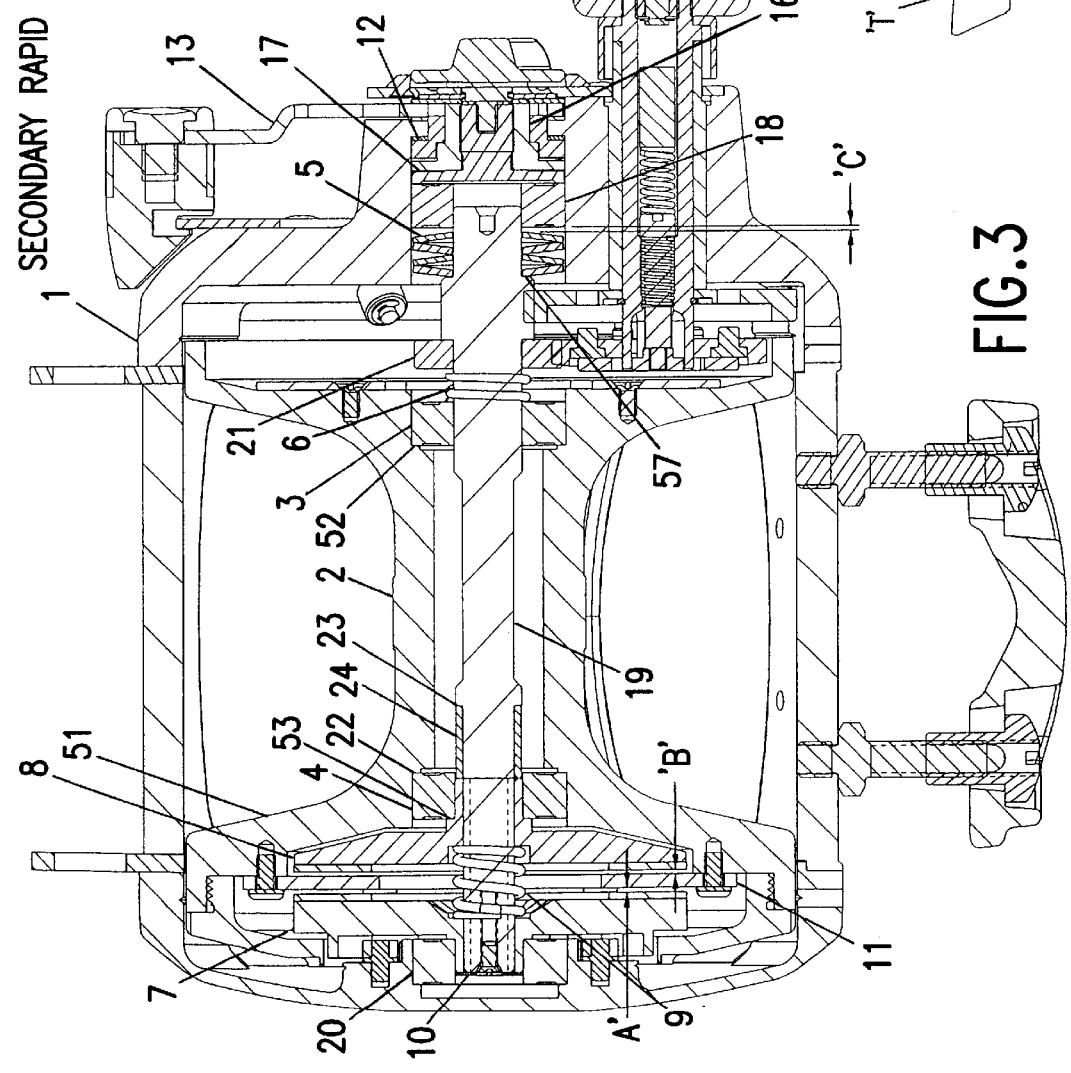
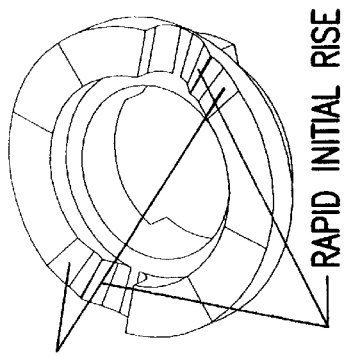
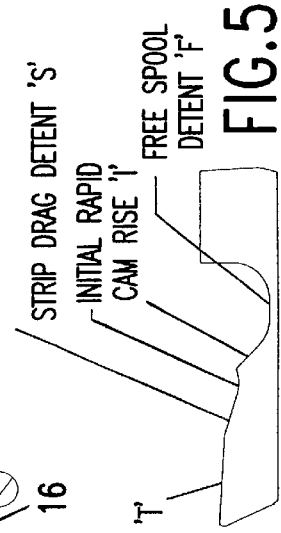
FIG. 3
FIG. 4
FIG. 5

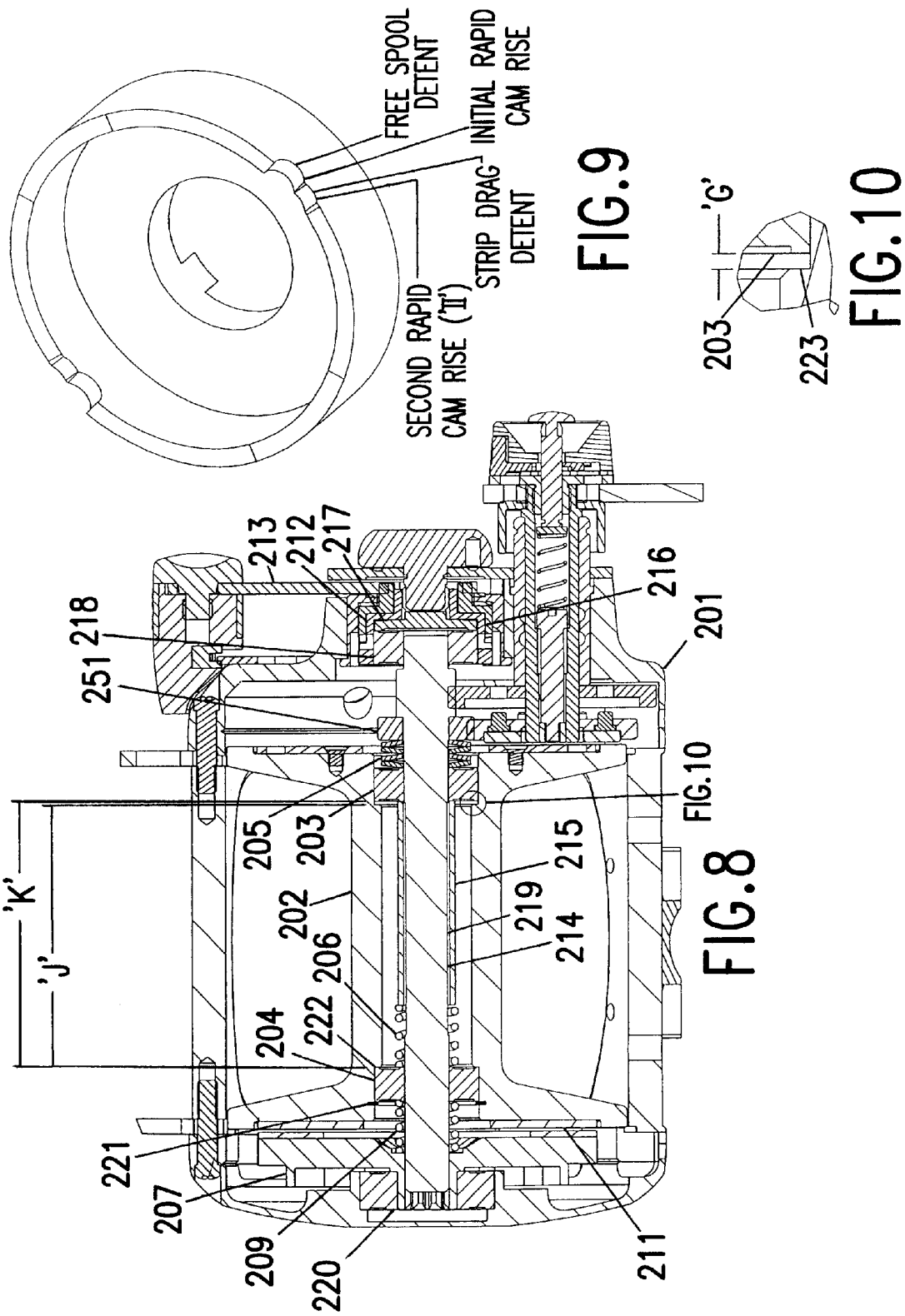

FISHING REEL WITH STRIP DRAG MECHANISM

BACKGROUND OF THE INVENTION

1. Field of the Invention

This invention relates to fishing reels and, in particular, to an improved drag mechanism having an additional drag position, just above free spool, and identified herein as a "strip" drag position.

2. Description of the Prior Art

The lever drag reel, such as that shown in section in prior art FIG. 1, is well known in the art. U.S. Pat. No. 3,425,644 shows the classic layout of this type of reel. There are disadvantages related to the drag application mechanism of this type of reel.

In this style reel, a lever is used to vary the amount of drag force that is applied to the fishing line. When this lever is moved, i.e., backed off, to its rearmost position, no drag is exerted on the spool. This condition is called "free spool". In this position, line can be freely played out from the spool of the reel.

At another position, approximately two-thirds of the full forward swing of the lever, is a moveable stop. This position is called "strike" position.

The position at full lever travel is called "full".

The drag lever is keyed to a cam member. This member translates the rotational motion of the lever into axial motion. When the drag lever is moved out of the free spool position, axial motion caused by the cam removes any clearance between the drag members. Once this clearance is removed, additional axial motion (due to the cam) directly compresses a set of clutch springs.

The lever drag reel is generally designed to fish different weight fishing lines. When the strength of the line being used is increased, it is possible to apply more drag than with a lighter line. Therefore, a means to adjust the drag force at a given position of the drag lever, namely the strike position, is desirable. Nearly all lever drag reels have such a means; usually through a screw member that varies the clearance between the drag members.

The classic lever drag reel is described in U.S. Pat. No. 3,425,644. In FIG. 1 of that patent, the drag lever 75 and the preset adjusting knob 92 are shown. In FIG. 6, the cam 68, the cam follower 61, and the preset screw 63 are shown. FIG. 2 shows the drag members 37 and 42, the clearance between the drag members, and the drag springs 40. In FIG. 3, the threaded portion of the preset adjustment 62 is shown. This reel functions as described previously.

U.S. Pat. No. 5,575,432 shows the design of a typical cam in a lever drag reel. See FIG. 5. The free spool position 69 is a detent. As the cam is rotated with respect to the cam follower 61 and 65, an initial rapid axial motion is created due to this detent. It can be seen that the slope of the rest of the cam 70 is much less after this rapid initial rise. U.S. Pat. No. 3,478,979 also shows this cam design (FIG. 5, 63–66).

On most lever drag reels, the cam has a small section with a large slope. This section is positioned just after the free spool position. This small section can account for up to two-thirds of the entire travel of the cam. As a consequence, a detent is formed in the cam. This section is used to quickly remove the clearance between the drag members, resulting in drag being available in the shortest amount of drag lever travel. But there is a down side to this design. As the desired drag at the strike position is increased, the difference in drag between free spool and just out free spool increases. The result is a tendency for the drag lever to suddenly jump into the free spool position when the drag lever is moved to reduce drag. This can have dire consequences. If the fisherman is actively engaged with a large fish, and the reel jumps into free spool, a massive backlash will result, usually tangling the line, and then at best breaking off the line, or at worst, pulling the fishing outfit from the angler and over the side of the boat.

U.S. Pat. No. 3,146,966 shows an alternative lever drag reel design. In FIG. 11, a cam profile with an additional step/detent is shown. As is described in this patent, free spool occurs when the cam follower is in position 57, at the bottom of the cam profile. In order to get into the additional step, the reel must be taken into free spool, and then into the "strip" position. This does nothing to prevent the occurrence of a backlash from the reel going from a drag producing position to a free spool. In fact, this design invites this very occurrence.

One alternative to this rapid jump is to use a cam that smoothly slopes from the free spool position to its maximum travel. The disadvantage of this design is that the user never knows precisely where the reel is going to go into free spool when he moves the drag lever. This is due to the nature of the preset systems used, which do nothing more than vary the amount of clearance between the drag members. Thus, when the user changes the position of the preset knob, and thereby changes the clearance between the drag members, the amount of drag lever travel necessary to remove this clearance will vary, resulting in this imprecise condition.

U.S. Pat. No. 4,516,741 (FIGS. 4, 30 and 31) shows an example of a cam with no jump; just a smooth transition to the free spool position.

Prior Art FIG. 1 shows a typical lever drag reel. In this reel design, there exists a side plate 101, which contains a cam mechanism 112. This cam is connected to a drag lever 113. The cam acts upon a cam follower 116, which contains a preset screw 117. A bearing 118 is radially supported in the side plate, axially supported by the preset screw. Within this bearing is journaled a pinion 119. This pinion is supported at the opposite end by an outer drive plate 107; which itself is supported by a bearing 120. On the pinion rides a spool 102, which is supported radially by two bearings 103 and 104. The left side spool bearing 104 is supported axially on one side by a shoulder 122 machined into the spool. It rides on a protrusion of the inner drive plate 108, which in turn is supported radially by the pinion, and axially by the left spool bearing 104. A clutch separation spring 109 is located between the inner and outer drive plates. Both drive plates are keyed in some form to the pinion such that any rotation of the pinion is transferred directly to the drive plates. A drag washer 111 is supported radially by pins 121 that are pressed into the flange of the spool, but is allowed to float axially on these pins. A shoulder machined into the spool axially supports the right side spool bearing 103. Between the right side spool bearing 103 and the pinion gear 125 resides the clutch springs 105.

The operation of the reel is as follows. When the drag lever 113 is moved from the free spool position, the cam is rotated by a like amount. The rotary motion is translated into axial motion by the cam and cam follower. The cam follower transfers this axial motion to the preset screw and then through the right side plate bearing 118. The bearing directly moves the pinion shaft 119 in the direction of the arrow AA. This axially motion is transferred through the clutch spring 109, through the spool by means of the right side spool bearing 103, to the left side spool bearing 104, to the inner drive plate 108. This axially motion will continue through all of these members until the clearance between the inner drive plate 108 and the drag washer 111, and the outer drive plate 107 and the drag washer 111, is removed. At this point, compression of the clutch springs 105 will start. The axial load created by compressing the clutch springs 105 is transferred through the right side spool bearing 103 to the left side spool bearing 104 to the inner drive plate 108. Thus, in the prior art, the length of travel which corresponds to the compression of the Belleville springs 105 would continue after other clearances were taken up.

As can be seen, all four bearings are loaded when the reel is in operation. Thus, this requires the spool bearings to be larger than otherwise necessary, so that they can handle the axial loads generated in the reel. Larger bearings tend to hamper the "freeness" of free spool. They also add inertia to the rotating assembly.

When the reel is in free spool, the drag washer is free to move away from both drive plates. It self centers between the drag members. There are several disadvantages to this design. First, the drag washer will make noise when the spool is rotated. This is due to the necessary clearance between the pins in the spool and the holes in the drag washer. The second is the amount of contact area between the pins and the drag washer. Assuming six 0.188" pins, and contact around half of the circumference of the pin (due to clearances), and a 0.094" thick drag washer, there is only 0.166 square inches of contact, versus 2.72 square inches available if the drag washer was directly attached to the spool flange. This contact area is important to the transfer of heat from the drag washer to the spool. The greater the area, the cooler the drag washer will operate. This promotes better drag operation, and a more durable drag.

Accordingly, it is desirable to have a more precise and predictable, adjustable drag means to prevent the problems as described of the prior art.

SUMMARY OF THE INVENTION

This invention seeks to prevent the above from happening by adding another position to the drag lever travel; which position is called the "strip" drag position; and which is positioned just above the free spool position. At this position, an additional detent is added, splitting the original steep cam rise into two sections. The result of this invention is a light drag setting before achieving free spool; thus preventing the operator from accidentally placing the drag lever into a free spool condition. This change, along with various and distinct internal designs, provides for a small difference in drag between the free spool position and at the "strip" drag position.

Thus, in accordance with a preferred embodiment of my invention, I have provided, in a fishing reel having a spool mounted for rotation about its axis and a drag means for imparting a drag on the rotation of said spool; said drag means comprising a cam means, a portion thereof being rotatable; said cam means having a working surface and a follower engaging said working surface to provide axial movement of a portion thereof upon rotation thereof within the reel to impart different degrees of drag on said spool; said working surface having portions thereof of different profiles; a first of said portions having a profile providing for a free spool condition imparting no drag to said spool; and a third of said portions having a profile providing for at least a full drag condition to said spool;

the improvement comprising: a second portion positioned between the first and third portions, and having a profile surface providing a strip drag condition which provides minimal drag on said spool, whereby when said cam means is moved from a position providing said third condition toward a position providing said first condition, the cam means will impart minimal drag to said spool in said second position before reaching said first position.

At this first position, free spool occurs. There are three critical clearances: that between the outer drive plate and the drag washer (Clearance A); the distance between the inner drive plate and the drag washer (Clearance B); and the third clearance which is the difference in the distance between the high speed gear surface on the pinion 119 and the right side plate bearing and the total height of the clutch springs (Clearance C). The configuration of the cam is dependent on these three clearances. It is important to note that initial adjustment of the preset system will not change the clearance between the drag members, but will remove Clearance C. Further adjustment of the preset system will then remove Clearance A, up to the point of contact between the outer drive plate and the drag washer, which will result in the loss of flee spool.

In particular embodiments, the configuration of the cam also depends on spring rates. Belleville clutch springs are the strongest. Clutch separation springs are much lighter and still lighter is a secondary clutch spring.

BRIEF DESCRIPTION OF THE DRAWINGS

FIG. 3 shows a modified reel in accordance with my invention;

FIG. 4 shows a perspective view of a cam used in the mechanism of FIG. 3;

FIG. 5 is a diagrammatic view of a portion of the cam of FIG. 4;

FIG. 8 shows a further alternate embodiment of my invention, in section;

FIG. 9 shows a perspective view of the cam used in the embodiment of my invention shown in FIG. 8;

FIG. 10 is an enlarged view of a portion of the device shown in FIG. 8;

DETAILED DESCRIPTION OF THE PREFERRED EMBODIMENTS

Figure 1:
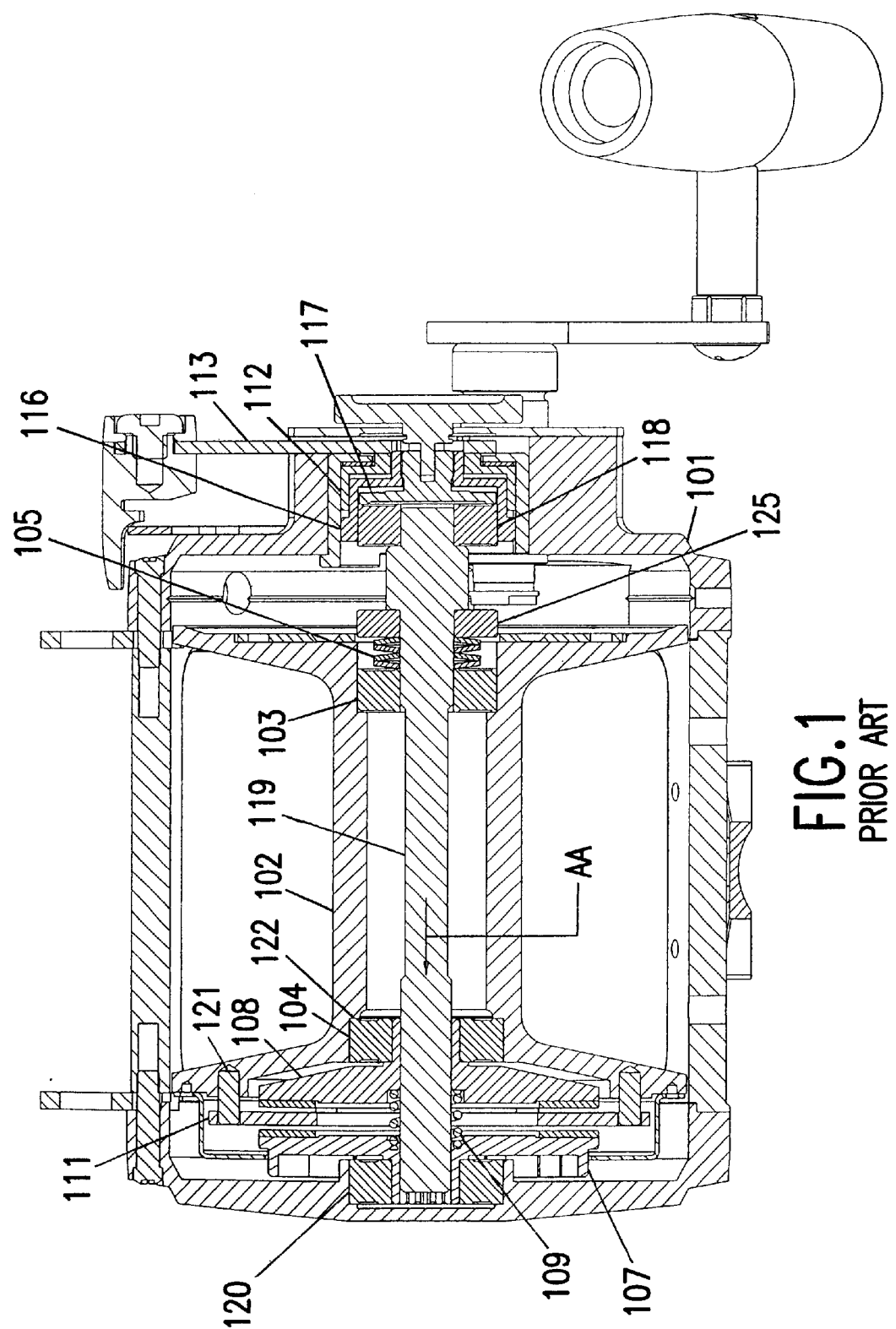
FIG. 1 shows a prior art dual drag reel in section.
Figure 2:
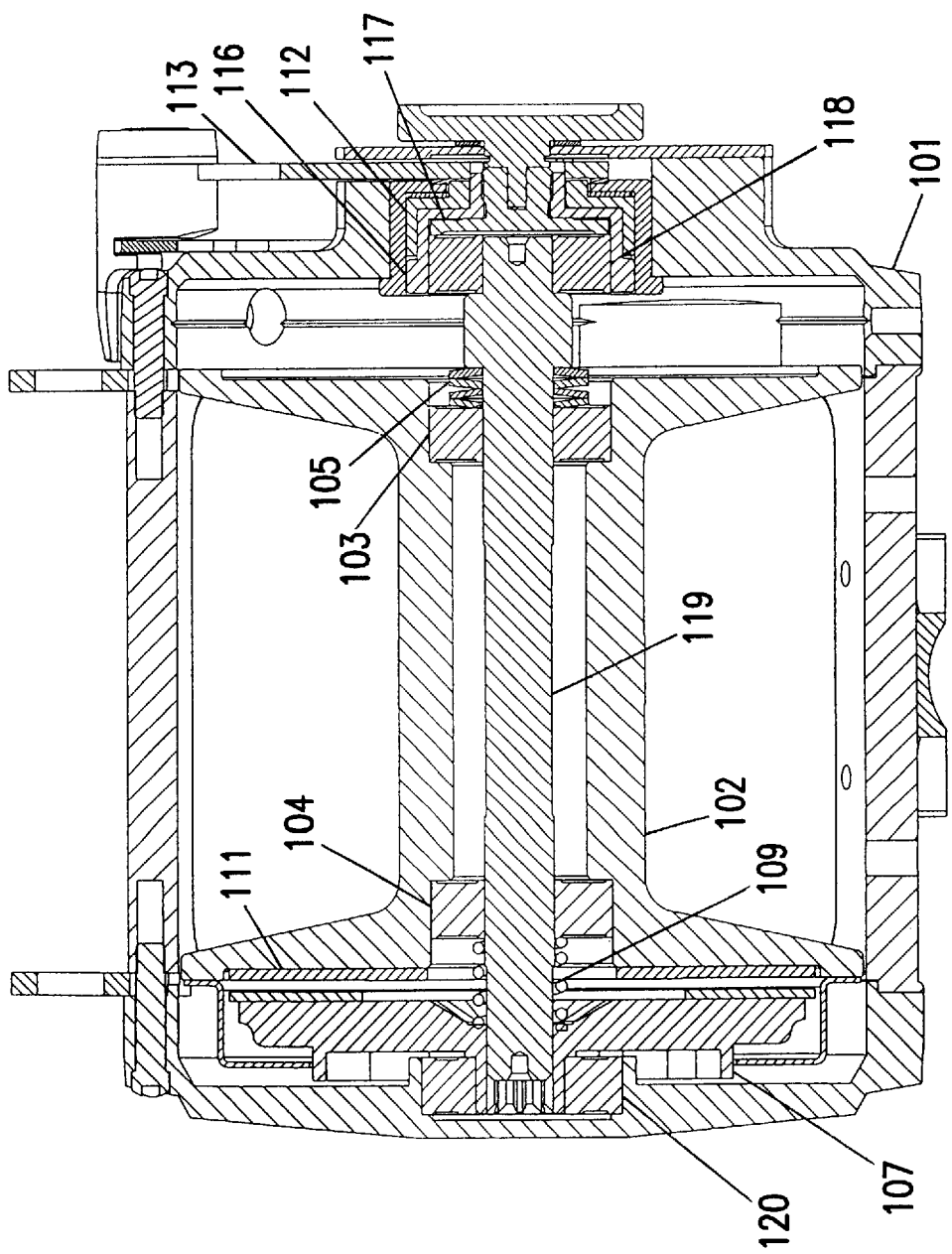
FIG. 2 is an additional prior art figure of a single drag reel shown in section.

Referring to the FIGS. 3, 4 and 5 of my new reel design, there is shown a side plate 1, which contains a cam mechanism 12. This cam is connected to a drag lever 13. The cam acts upon a cam follower 16, which contains a preset screw 17. A bearing 18 is radially supported in the side plate, axially supported by the preset screw. Within the bearing is journaled a pinion 19. Between the gear machined on the pinion and the plate bearing 18 reside the clutch springs 5. This pinion is supported at the opposite end by an outer drive plate 7, which itself is supported by a bearing 20. On the pinion rides a spool 2, which is supported radially by two bearings 3 and 4. The left side spool bearing 4 is supported axially on one side by a shoulder 22 machine into the spool. It rides on a protrusion of the inner drive plate 8, which in turn is supported radially by the pinion, and axially by a shoulder or other retaining means 23 attached directly to the pinion. A clutch separation spring 9 is located between the inner and outer drive plates. Both drive plates are keyed in some form to the pinion such that any rotation of the pinion is transferred directly to the drive plates. A drag washer 11 is fixedly attached to the flange 51 of the spool 2. A shoulder 52 machined into the spool 2 axially supports the right side spool bearing 3. Between the right side spool bearing 3 and the gear 21 resides the secondary clutch spring 6. A retaining plate 10 is fixedly attached to the end of the pinion.

At free spool, there is clearance between the drag washer 11 and the drive plates 7 and 8. This distance is variable through the use of the preset screw. This distance will vary from a maximum clearance due to the design of the spool assembly, to no clearance, that is, contact between the drag washer 11 and drive plates 7 and 8.

At free spool and with the preset set to its minimum amount, the reel will be as shown in FIG. 3. The maximum clearance between the drive plates and the drag washer is set by design. The distance between the shoulder 23 on the pinion shaft 19 and the retaining plate 10 minus the thickness of the inner and outer drive plates, the drag washer, and the sleeve (24) defines this maximum clearance. The secondary clutch spring 6 provides an axial load on the right side spool bearing 3, forcing the right side spool bearing into contact with the shoulder 52 in the spool. This force is then transferred to the left side spool bearing 4 through the shoulder 22 in the left side of the spool, and then finally from the left side spool bearing to a shoulder 53 on the inner drive plate 8. At this point, the drag washer is at a designed distance from the inner drive plate.

The secondary clutch spring 6 is necessary to prevent the drag washer 11 from contacting the inner drive plate 8 through shifting of the spool axially, thus preventing free spool operation. The secondary clutch spring 6 is not as heavy as the clutch separation spring 9. Therefore, while the secondary clutch spring 6 pushes the spool 2 to the left, the spool will only travel until the bearing 4 butts up against the shoulder 53 of the plate 8. The heavier spring 9 prevents fisher movement to the left by the force of the spring 6. Since the drag washer 11 is fixedly attached to the spool 2, it is thus held away from the inter drive plate 8.

At this rest position, free spool occurs. There are three critical clearances: that between the outer drive plate 7 and the drag washer 11 (Clearance A); the distance between the inner drive plate 8 and the drag washer 11 (Clearance B); and the third clearance which is the difference in the distance between the high speed gear surface 57 on the pinion 19 and the right side plate bearing 18 and the total height of the clutch springs 5 (Clearance C). The configuration of the cam is dependent on these three clearances. It is important to note that initial adjustment of the preset system will not change the clearance between the drag members, but will remove Clearance C. Further adjustment of the preset system will then remove Clearance A, up to the point of contact, which will result in the loss of free spool. The configuration of the cam also depends on the spring rates. The Belleville springs 5 are the heaviest of the clutch springs providing a force of approximately 2,000 pounds per inch. The clutch separation springs 9 are much lighter and provide, for example, a force of 50 to 100 pounds per inch. Still lighter is the secondary clutch spring 6 which provides a force of approximately 10 to 20 pounds per inch.

FIG. 5 illustrates the cam rises in accordance with my invention. A free spool detent is shown at "F". This provides an initial cam rise at "I". Then comes the strip drag detent "S" which includes a second rapid cam rise "R" to the normal extended cam surface "T" for applying drag. It is understood that those skilled in the art can adjust these clearances and spring strengths within the parameters of my invention depending on the size of the reel and the materials used in manufacturing it.

The preset system of the reel consists of a threaded member 17. As adjustments are made, the preset screw causes axial motion of the right side plate bearing 18. This varies the amount of clearance available in the reel. This total clearance will include both Clearance A, Clearance B, and Clearance C. The initial rapid cam rise will be sized to equal Clearance A plus Clearance C. The second rapid cam rise will be equal to Clearance B.

In operation, when the drag lever is thrown from free spool to strip drag position, Clearance A and Clearance C are removed. The drag washer 11 is pushed against the outer drive plate 7. The axial force acting on these members is due entirely to the secondary coil spring 6.

As the drag lever motion is continued, the cam advances through the second rapid cam rise. This closes the remaining clearance between the drag washer 11 and the inner drive plate 8. Any further axial motion of the cam compresses the clutch springs 5.

As the preset of the reel is increased, Clearance C is first removed, then Clearance A is removed. Once all of Clearance A is removed, free spool is lost. Motion of the drag lever to the strip drag position will remove any remaining Clearance C, Clearance A, and a portion of Clearance B. Drag will still be light since the spring rate of the secondary clutch spring 6 is much less than that of the clutch springs 5. As the drag lever is thrown out of strip drag, the remaining Clearance B is removed and the clutch springs 5 are partially compressed. The reel is now in normal drag operation. The strip drag provides about one pound of drag at most settings. Note that the reel has a mechanical advantage over the drag lever. For example, to apply drag, it takes a lot of effort to move the lever; whereas, when dropping down, it takes a lot less effort due to the incline of the cam.

In my invention there are a number of advantages. One advantage is that when the pinion has reached the limit of its travel, so have the pinion gears. The Belleville springs 5 can still be compressed further, thereby increasing drag.

In this embodiment, there are several improvements over the prior art. These are as follows:

1. A load isolated spool. The spool acts as a heat sink, but imposes no loads on any part of the reel. Most lever drag reels transfer the axial loads through the spool. As the spool heats up due to friction of the drag, it will expand. This will cause further compression of the clutch springs, thus increasing drag. This embodiment will not do this, since the axially load of the clutch springs acts directly on the inner drive plate; not through the spool.

2. Improved heat sink. The drag washer is now solidly mounted to the spool. In previous dual drag designs, the drag washer was mounted on pins, and was free to float on these pins. This allowed the drag washer to find its own center between the drive plates. The previous designs were limited to the area available to conduct heat from the drag washer. The new mounting system for a dual drag reel provides a 3500% increase in contact area. Testing has shown that this greatly reduces temperature at the drag washer, improves consistency of the drag, and improves the durability of the drag.

3. Freer operation. Due to the placement of the clutch springs, the present embodiment will not greatly axially load the spool bearing in a drag producing condition. The loads created due to compression of the clutch springs are transferred directly through the shoulder on the pinion to the inner drive plate. The only axially loads seen by the spool bearings are due to the secondary clutch spring. As mentioned, these loads are much less than those generated by the clutch springs. Thus, it can be seen that only two bearings in the reel are axially loaded by compression of the clutch springs. In the prior art (FIG. 1), the clutch springs are located between the pinion gear and the spool bearing. When the clutch springs are compressed, all four bearings in the reel are loaded axially.

4. Improved free spool. Since the spool bearings are not loaded axially as in previous designs, they can be reduced in size. A smaller bearing has a lower rotating torque requirement than a larger bearing, all other things being equal. This reduction in bearing torque allows for freer rotation of the spool.

Figure 6:
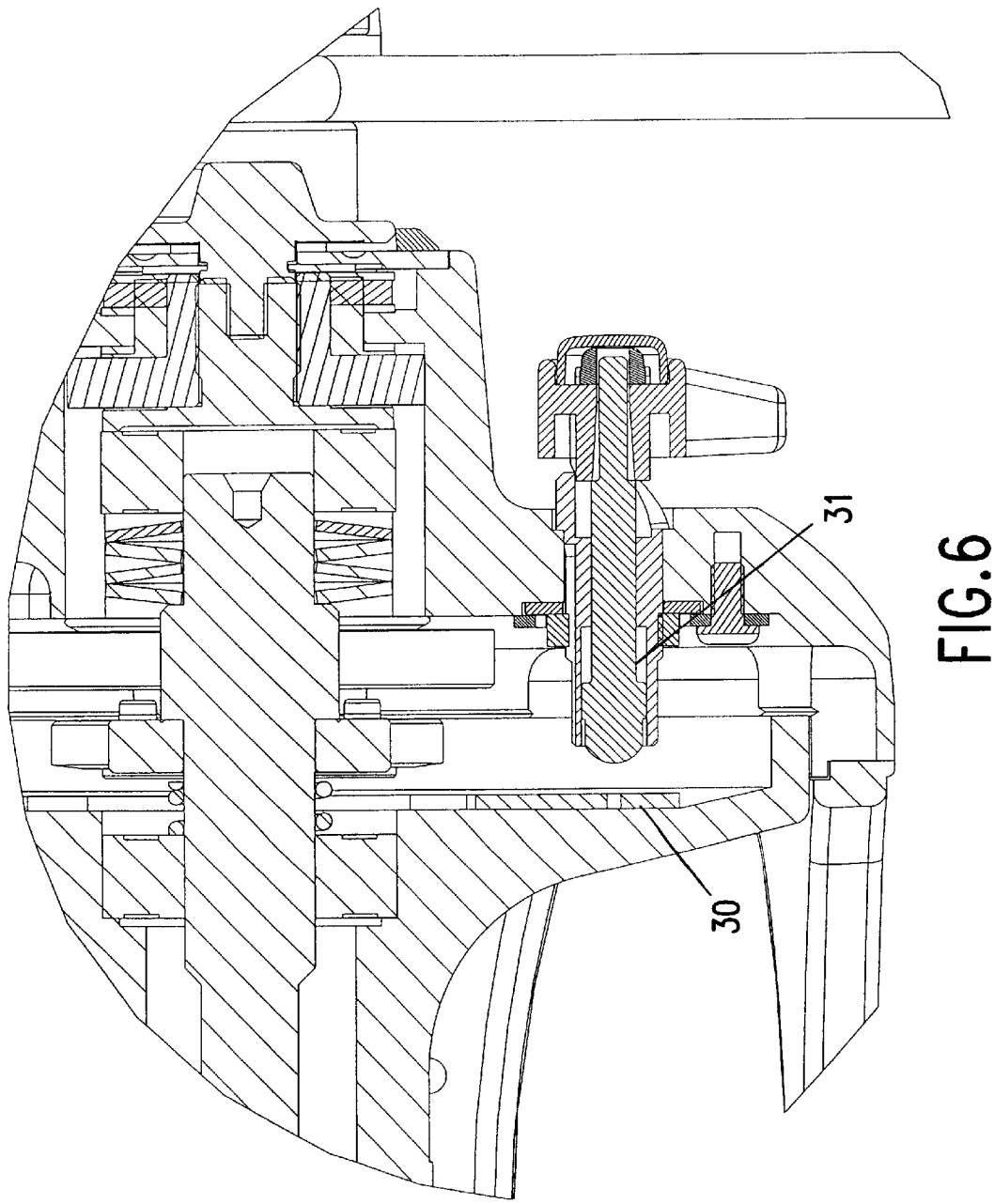
FIG. 6 is a sectional view of a "click" system.

5. Better click operation. This is due to limited axial spool motion. There is a retainer 10 at the end of the pinion shaft. When the drag lever is moved into free spool, the spool will move axially to the right up until the point where the retainer at the end of the pinion shaft contacts the outer drive plate. Prior art lever drag reels did not have this plate, and thus the spool would continue to move to the right until the preset was at its minimum. Thus, the click had to be designed to accommodate a much larger range of spool locations (since the click operates with a ratchet plate (30, FIG. 6) mounted to the spool). With the limitation placed on spool axial motion, the click can be designed to operate over a narrower range at spool locations, and, accordingly, it can be designed more precisely. The click pin (31) can be moved more closely to the racket plate due 30 to the reduced axial travel.

6. Better low speed gear engagement. In the prior art (FIG. 1), the clutch springs are situated between the pinion gear and the right side spool bearing. Also, there is no retaining plate on the end of the pinion. When the reel is in free spool, the pinion is free to move in a direction to the opposite arrow "AA". With the preset set to its minimum, the pinion, and thus the gears, will move to the right under the influence of the clutch separation spring. Conversely, when the preset is set to its maximum amount, the pinion will be further along with the direction of the arrow "AA" than in this embodiment. This is due to the fact that the drag washer is self-centering. Nearly all of the clearance between both the inner and outer drive plates and the drag washer can be removed. In addition, the pinion will continue to move along in the direction of the arrow "AA" when the drag lever is operated to compress the clutch springs. Thus, there is considerably more gear travel in the prior art than in this embodiment.

This additional gear travel limits the amount of gear engagement when the reel is in a high drag producing condition. There is only so much gear travel available in the gear shift mechanism. In addition, the drive gears must be positioned so that the low speed gear set will not engage when the preset system is set to its minimum and the reel is in free spool.

As can be seen, improvements can be made by limiting the movement of the pinion, and thus the gears. The addition of the retaining plate limits movement in a direction opposite to the arrow "AA". This allows closer placement of the drive gears to the pinion gears. Thus, with the available travel in the gear shift mechanism, greater gear engagement can be achieved.

Figure 7:
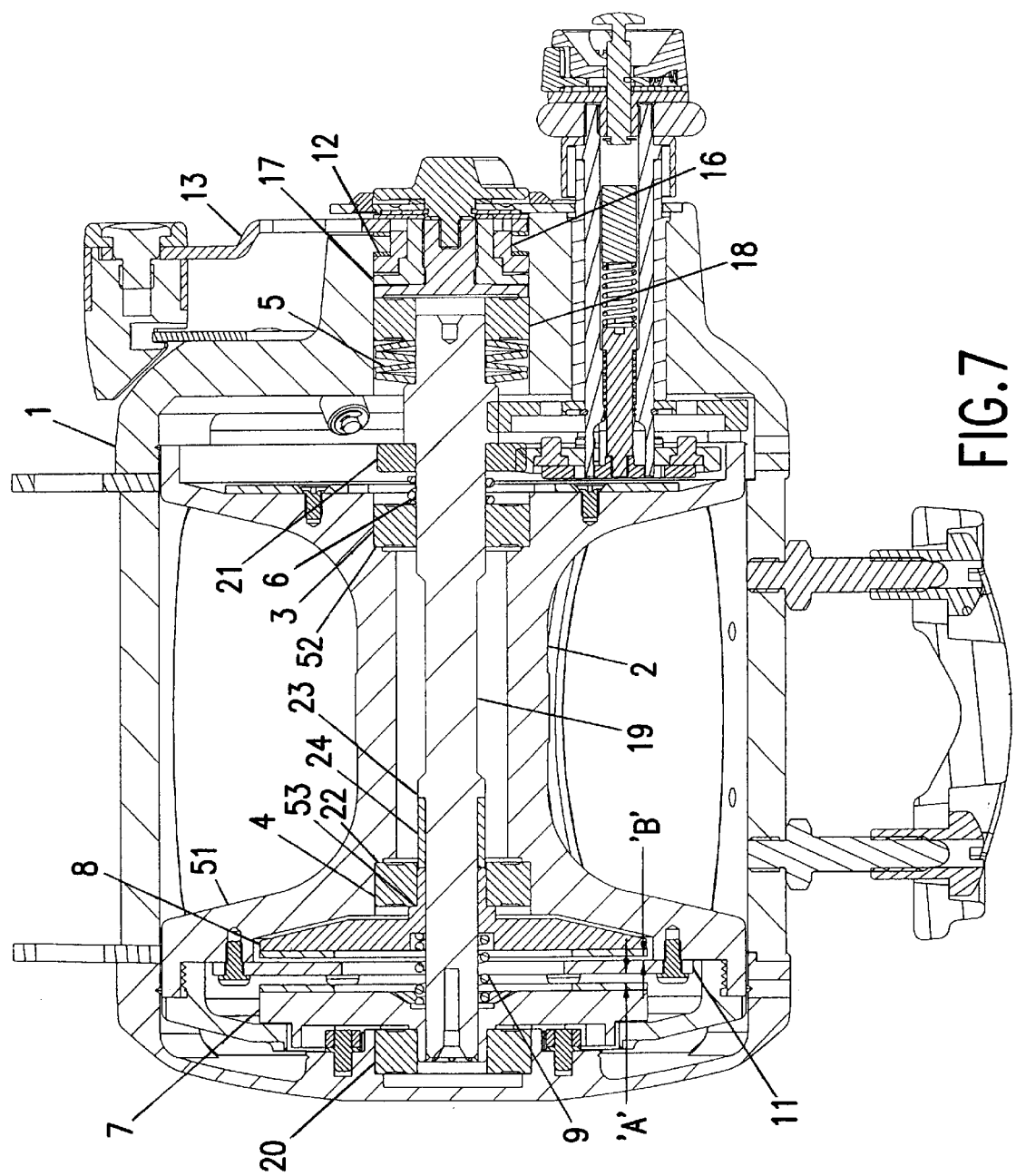
FIG. 7 shows a section of an alternate embodiment of my invention.

Referring to the FIG. 7 of my new reel design, there is shown a side plate 1, which contains a cam mechanism 12. This cam is connected to a drag lever 13 The cam acts upon a cam follower 16, which contains a preset screw 17. A bearing 18 is radially supported in the side plate, axially supported by the preset screw. Within the bearing is journaled a pinion 19. Between the gear machined on the pinion and the plate bearing 18 reside the clutch springs 5. This pinion is supported at the opposite end by an outer drive plate 7, which itself is supported by a bearing 20. On the pinion rides a spool 2, which is supported radially by two bearings 3 and 4. The left side spool bearing 4 is supported axially on one side by a shoulder 22 machine into the spool. It rides on a protrusion of the inner drive plate 8, which in turn is supported radially by the pinion, and axially by a shoulder or other retaining means 23 attached directly to the pinion. A clutch separation spring 9 is located between the inner and outer drive plates. Both drive plates are keyed in some form to the pinion such that any rotation of the pinion is transferred directly to the drive plates. A drag washer 11 is fixedly attached to the flange 51 of the spool 2. A shoulder 52 machined into the spool 2 axially supports the right side spool bearing 3. Between the right side spool bearing 3 and the gear 21 resides the secondary clutch spring 6.

At free spool, there is clearance between the drag washer 11 and the drive plates 7 and 8. This distance is variable through the use of the preset screw. This distance will vary from a maximum clearance due to the design of the spool assembly, to no clearance, that is, contact between the drag washer 11 and drive plates 7 and 8.

At free spool and with the preset set to its minimum amount, the reel will be as shown in FIG. 7. The secondary clutch spring 6 provides an axial load on the right side spool bearing 3, forcing the right side spool bearing into contact with the shoulder 52 in the spool. This force is then transferred to the left side spool bearing 4 through the shoulder 22 in the left side of the spool, and then finally from the left side spool bearing to a shoulder 53 on the inner drive plate 8. At this point, the drag washer is at a designed distance from the inner drive plate.

The secondary clutch spring 6 is necessary to prevent the drag washer 11 from contacting the inner drive plate 8 through shifting of the spool axially, thus preventing free spool operation. The secondary clutch spring 6 is not as heavy as the clutch separation spring 9. Therefore, while the secondary clutch spring 6 pushes the spool 2 to the left, the spool will only travel until the bearing 4 butts up against the shoulder 53 of the plate 8. The heavier spring 9 prevents further movement to the left by the force of the spring 6. Since the drag washer 11 is fixedly attached to the spool 2, it is thus held away from the inter drive plate 8.

At this rest position, free spool occurs. There are two critical clearances: that between the outer drive plate 7 and the drag washer 11 (Clearance A); the distance between the inner drive plate 8 and the drag washer 11 (Clearance B). The configuration of the cam is dependent on these two clearances. It is important to note that adjustment of the preset system will vary clearance "A" only. The configuration of the cam also depends on the spring rates. The Belleville springs 5 are the heaviest of the clutch springs providing a force of approximately 2,000 pounds per inch. The clutch separation springs 9 are much lighter and provide, for example, a force of 50 to 100 pounds per inch. Still lighter is the secondary clutch spring 6 which provides a force of approximately 10 to 20 pounds per inch.

FIG. 5 illustrates the cam rises in accordance with my invention. A free spool detent is shown at "F". This provides an initial cam rise at "I". Then comes the strip drag detent "S" which includes a second rapid cam rise "R" to the normal extended cam surface "T" for applying drag. It is understood that those skilled in the art can adjust these clearances and spring strengths within the parameters of my invention depending on the size of the reel and the materials used in manufacturing it.

The preset system of the reel consists of a threaded member 17. As adjustments are made, the preset screw causes axial motion of the right side plate bearing 18. This varies the amount of clearance available in the reel. This total clearance will include Clearance A and Clearance B. The initial rapid cam rise will be sized to equal Clearance A. The second rapid cam rise will be equal to Clearance B.

In operation, when the drag lever is thrown from free spool to strip drag position, Clearance A is removed. The drag washer 11 is pushed against the outer drive plate 7. The axial force acting on these members is due entirely to the secondary coil spring 6.

As the drag lever motion is continued, the cam advances through the second rapid cam rise. This closes the remaining clearance between the drag washer 11 and the inner drive plate 8. Any further axial motion of the cam compresses the clutch springs 5.

As the preset of the reel is increased, Clearance A is decreased. Once all of Clearance A is removed, free spool is lost. Motion of the drag lever to the strip drag position will remove any remaining Clearance A, and a portion of Clearance B. Drag will still be light since the spring rate of the secondary clutch spring 6 is much less than that of the clutch springs 5. As the drag lever is thrown out of strip drag, the remaining Clearance B is removed and the clutch springs 5 are partially compressed. The reel is now in normal drag operation. The strip drag provides about one pound of drag at most settings.

Note that in my invention, the light drag occurs before the free spool condition.

The Belleville springs of the prior art reels are moved to the outside against the gear and are replaced by a coil spring 6.

The drag washer is no longer movable, but is now fixed.

Once all the clearances are removed, the pinion stops moving. The right side plate bearing will continue to move and compress the Belleville springs.

In this embodiment, there are several improvements over the prior art. These are as follows:

1. A load isolated spool. The spool acts as a heat sink, but imposes no loads on any part of the reel. Most lever drag reels transfer the axial loads through the spool. As the spool heats up due to friction of the drag, it will expand. This will cause further compression of the clutch springs, thus increasing drag. This embodiment will not do this, since the axially load of the clutch springs acts directly on the inner drive plate; not through the spool.

2. Improved heat sink. The drag washer is now solidly mounted to the spool. In previous dual drag designs, the drag washer was mounted on pins, and was free to float on these pins. This allowed the drag washer to find its own center between the drive plates. The previous designs were limited to the area available to conduct heat from the drag washer. The new mounting system for a dual drag reel provides a 3500% increase in contact area. Testing has shown that this greatly reduces temperature at the drag washer, improves consistency of the drag, and improves the durability of the drag.

3. Freer operation. Due to the placement of the clutch springs, the present embodiment will not greatly axially load the spool bearing in a drag producing condition. The loads created due to compression of the clutch springs are transferred directly through the shoulder on the pinion to the inner drive plate. The only axially loads seen by the spool bearings are due to the secondary clutch spring. As mentioned, these loads are much less than those generated by the clutch springs. Thus, it can be seen that only two bearings in the reel are axially loaded by compression of the clutch springs. In the prior art (FIG. 1), the clutch springs are located between the pinion gear and the spool bearing. When the clutch springs are compressed, all four bearings in the reel are loaded axially.

4. Improved free spool. Since the spool bearings are not loaded axially as in previous designs, they can be reduced in size. A smaller bearing has a lower rotating torque requirement than a larger bearing, all other things being equal. This reduction in bearing torque allows for freer rotation of the spool.

Referring to the alternate design shown in FIGS. 8, 9 and 10, in this reel there exists a side plate 201, which contains a cam mechanism 212. This cam is connected to a drag lever 213. The cam acts upon a cam follower 216, which contains a preset screw 217. A bearing 218 is radially supported in the side plate, axially supported by the preset screw. Within this bearing is journaled a pinion 219. This pinion is supported at the opposite end by a drive plate 207, which in turn is supported by a bearing 220. On this pinion rides a spool 202, which is supported radially by two bearings 203 and 204. A drag washer 211 is attached to the flange of the spool. The left side spool bearing 204 is supported axially on one side by a shoulder 222 machined into the spool, and on the other side by a retaining means, such as a retaining ring 221. The right side spool bearing is provided clearance axially to allow axial movement through the clearance space G, FIG. 10. Between the right side spool bearing and the pinion gear 251 reside the clutch springs 205. Abutting the right side spool bearing 203 on the inside of the spool 202 is a spacer sleeve 215. Between this spacer sleeve 215 and the left side spool bearing 204 is the secondary clutch spring 206. A clutch separation spring 209 is located between the left side spool bearing and the drive plate 207.

The overall height "K" of the secondary clutch spring 206 and spacer sleeve 215 is a set amount greater than the distance "J" between the bearing bores in the spool. When parts 206 and 215 are assembled in the spool, the right side spool bearing 203 is moved off of the shoulder 223 (FIG. 10) of the spool. This distance "G" is equal to the second rapid cam rise "II", FIG. 9.

At free spool, there is clearance between the drag washer 211 and the drive plate 207. This distance is variable through the use of the preset screw. This distance will vary from the maximum clearance due to the physical constraints of the reel to contact between the drag washer 211 and the drive plate 207. This does not necessarily define the operational range of the preset system. Maximum clearance may be such that the rise available in the cam is not great enough to close the gap between the drag washer 211 and drive plate 207. There will exist a clearance that will provide the minimum drag for which the reel is designed. This said clearance is a function of the spring rate of the clutch springs 205 and the cam profile. The initial rapid cam rise must be sized to this said clearance.

In operation, the reel will function as follows. With the reel in free spool, the operator will adjust the preset knob to achieve a desired drag at the strike position. When the user throws the drag lever from free spool to the strip drag position, the cam will advance the cam follower through the initial rapid cam rise to the strip drag detent. This axial motion will close whatever remaining clearance there is between the drag washer and the drive plate, and in turn will compress the drag separation spring 209. If the clearance between the drag members was less than the amount of axial travel generated by the cam, the right side spool bearing clearance "G" will be partially removed. This will also cause compression of the secondary clutch spring 206. At this point, the axial load on the friction members 207 and 211 is due entirely to compression of the secondary clutch spring 206.

It is important to note that the right side spool bearing clearance "G" and the addition of the secondary clutch spring allow for function of the strip drag position over a wide range of preset settings. When the preset is adjusted such that the clearance between the drag members is equal to the amount of axial travel available in the initial rapid cam rise, movement of the drag lever to the strip drag position will remove this clearance. This will cause contact between the drag members. At this point, the right side spool bearing clearance has not changed. When the drag lever is moved from the strip drag position to the normal operation range, the right side spool bearing clearance is removed, and the right side spool bearing makes contact with a shoulder machined into the spool. Further motion of the drag lever will cause further axial motion. This motion directly compresses the clutch springs between the right side spool bearing and the pinion gear. This axial load is transferred directly into the drag member through the spool, thus increasing the drag.

When the clearance between the drag members is set to a minimal amount, that amount being the amount necessary to retain free spool, the reel will provide its maximum drag. When the drag lever is moved to the strip drag position, this minimal clearance between the drag members is removed. A portion of the right side spool bearing clearance is also removed since the available cam travel is greater than the clearance between the drag members. At this point, the secondary clutch spring is compressed to a greater amount than in the previous condition; but since its spring rate is much less than that of the clutch springs, the amount of drag in the strip drag position changes very little. As the drag lever is moved out of the strip drag position, the remaining right side spool bearing clearance is removed, and compression of the clutch springs takes place. The reel now operates in normal fashion There are ways to achieve the same results by varying the configuration of the reel, such as swapping the position of the secondary clutch springs and the clutch springs. It should, therefore, be understood that the drawings are for illustrative purposes and that changes can be made without departing from the spirit of the invention.

Figure 12:
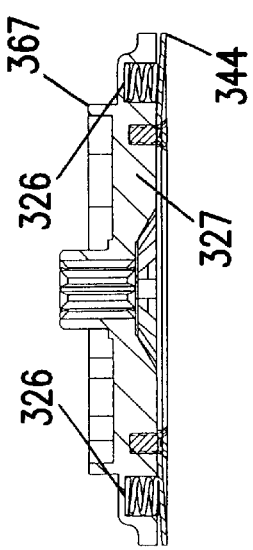
FIG. 12 is a section of a portion of the reel shown in FIG. 11.
Figure 13:
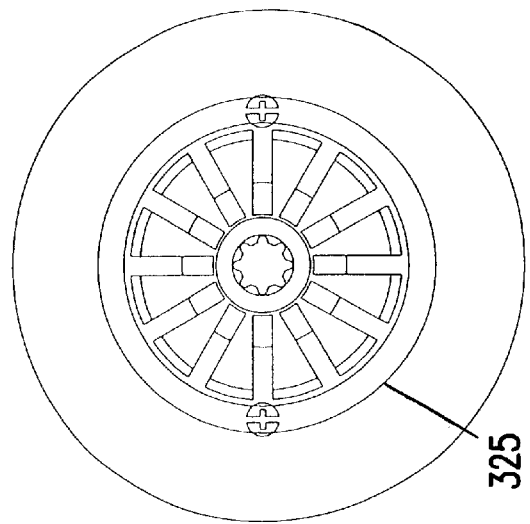
FIG. 13 is a plan view of a portion of the apparatus shown in FIG. 11.
Figure 11:
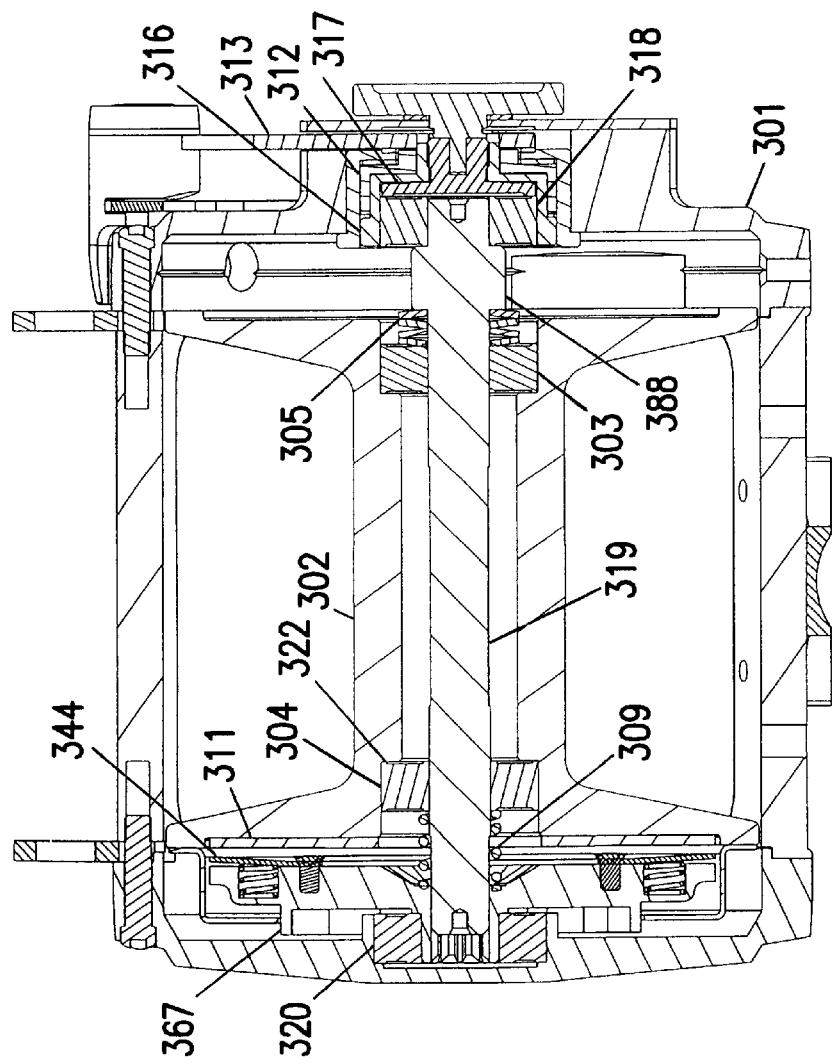
FIG. 11 shows a further alternate embodiment of my invention in section.

Referring to FIGS. 11, 12 and 13, in another alternate embodiment of my invention, there exists a side plate 301, which contains a cam mechanism 312. This cam is connected to a drag lever 313. The cam acts upon a cam follower 316, which contains a preset screw 317. A bearing 318 is radially supported in the side plate; axially supported by the preset screw. Within this bearing is journaled a pinion 319. This pinion is supported at the opposite end by a drive plate 307; which itself is supported by a bearing 320. On this pinion rides a spool 302, which is supported radially by two bearings 303 and 304. A drag washer 311 is fixedly attached to the flange of the spool. The left side spool bearing 304 is supported axially on one side by a shoulder 322 machined into the spool. A shoulder also locates the right side spool bearing axial. Between the right side spool bearing 303 and the pinion gear 388 reside the clutch springs 305. A clutch separation spring 309 is located between the left side spool bearing and the drive plate.

As shown in FIGS. 12 and 13, the outer drive plate 367 is modified such that the friction material 344 is no longer bonded to the backing member 327. Instead, it is retained around either its inner or outer periphery by some method. This retainer 325, FIG. 13, prevents rotation of the friction material. It also prevents axial motion of the edge that it retains. At the other periphery, a configuration of secondary clutch springs 326 between the friction material 344 and the backing member 327 deflects the friction material away from the backing member 327. This spring set can be a set of coil springs 326 as shown, or any system that will deflect the friction material 344. The friction material is displaced a set amount away from its backing member 327.

The reel works as follows. When the preset is set to a minimal value, there exists clearance between the friction material and the drag washer. When the drag lever is moved into the strip drag position, the drag washer is brought into contact with the displaced periphery of the friction material. At this point, the axial loads on the drag members are due entirely to the secondary clutch springs. As can be seen, there is a range of preset settings in which the friction material will not be completely compressed against the backing member. This defines the operational range of the strip drag position.

The maximum clearance between the friction material and the drag washer that can be used while still retaining the strip drag operation is equal to the axial travel of the first rapid cam rise. This way, when the drag lever is moved to the strip drag position, contact will result. If the first rapid cam rise is set to the available displacement of the friction material, the maximum operational range will be achieved.

The objective of the second rapid cam rise is to remove any remaining clearance between the friction material and its backing member. Thus, the axial travel available due to this rise should be set equal to the clearance between the friction material and the backing member. This value can be varied, for example, by setting the cam travel at a value greater than the ideal. This will result in the available drag force being increased throughout the drag lever's operational range. Conversely, setting the cam travel less than the ideal will result in a reduced drag force throughout the reel's operational range. Either way, it does not affect the operation of the strip drag position. So, when the drag lever is thrown out of strip drag, the friction material is pressed against its backing member and the reel operates in a normal fashion.

Figure 15:
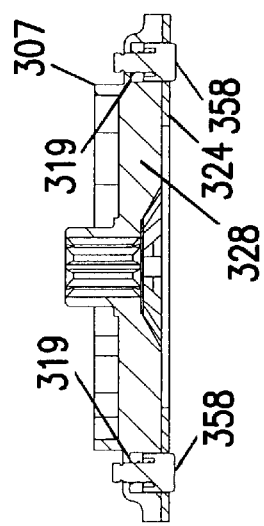
FIG. 15 is a section of a portion of the reel shown in FIG. 14.
Figure 16:
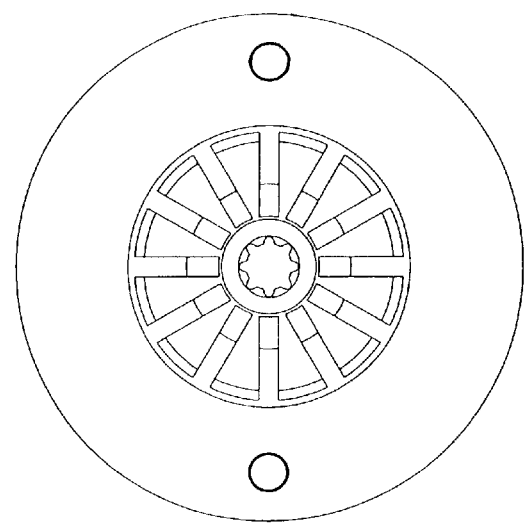
FIG. 16 is a plan view of a portion of the apparatus shown in FIG. 14.
Figure 14:
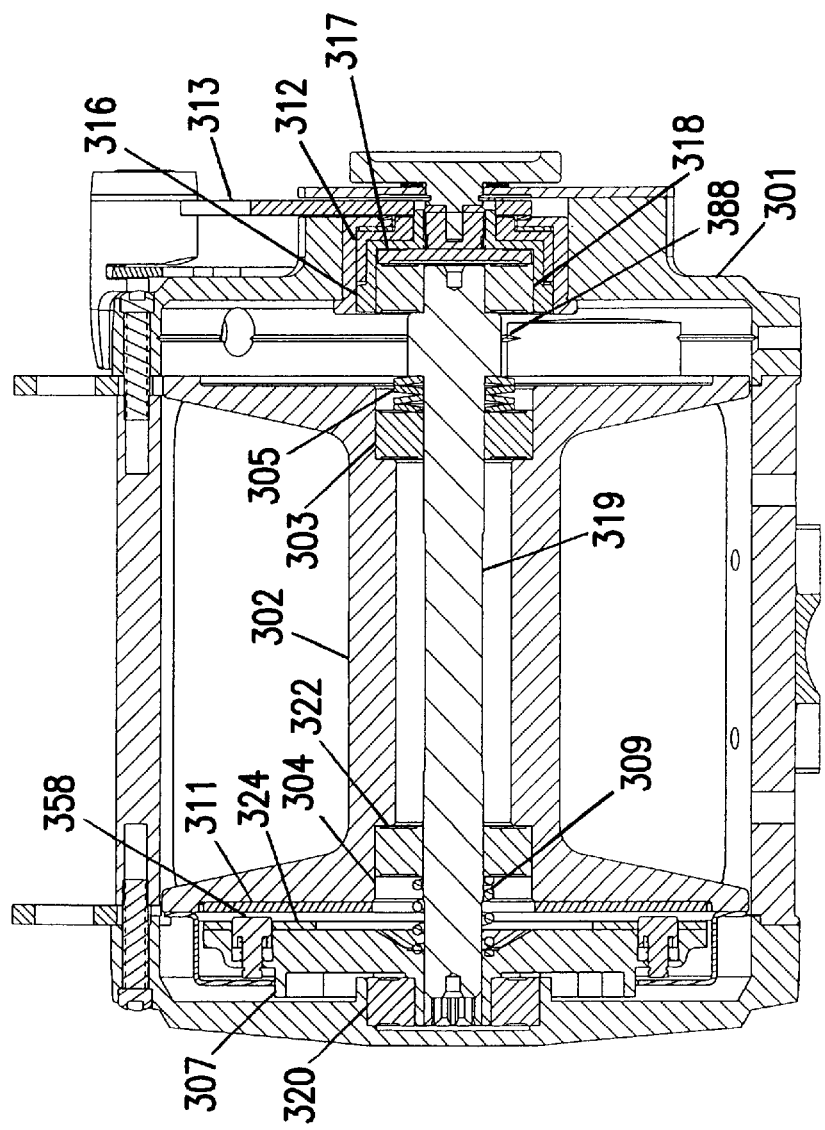
FIG. 14 shows a further alternate embodiment of my invention in section.

Referring to FIGS. 14, 15 and 16, in another alternate embodiment of my invention, there exists a side plate 301, which contains a cam mechanism 312. This cam is connected to a drag lever 313. The cam acts upon a cam follower 316, which contains a preset screw 317. A bearing 318 is radially supported in the side plate; axially supported by the preset screw. Within this bearing is journaled a pinion 319. This pinion is supported at the opposite end by a drive plate 307; which itself is supported by a bearing 320. On this pinion rides a spool 302, which is supported radially by two bearings 303 and 304. A drag washer 311 is fixedly attached to the flange of the spool. The left side spool bearing 304 is supported axially on one side by a shoulder 322 machined into the spool. A shoulder also locates the right side spool bearing axial. Between the right side spool bearing 303 and the pinion gear 388 reside the clutch springs 305. A clutch separation spring 309 is located between the left side spool bearing and the drive plate.

As shown in FIG. 15, the outer drive plate assembly 307 is modified such that the friction material 324 is still bonded to the backing member 328, but a series of spring loaded buttons 358 are fixedly attached; these buttons being arranged such that they protrude through the surface of the friction material 324. These are arranged such that they can move axially against secondary clutch springs 319, to the point where their outermost surface can become flush with the friction material. As many buttons may be placed on the drag washer as are needed to provide the desired drag in the strip drag position.

The buttons work as follows. When the present is set to a minimal value, there exists clearance between the buttons and the drag washer. When the drag lever is moved into the strip drag position, the drag washer is brought into contact with these buttons. At this point, the axial loads on the drag members are due entirely to the secondary clutch springs. As can be seen, there is a range of preset settings in which the buttons will not be displaced flush with the friction material. This defines the operational range of the strip drag position.

The maximum clearance between the buttons and the drag washer that can be used while still retaining the strip drag operation is equal to the axial travel of the first rapid cam rise. This way, when the drag lever is moved to the strip drag position, contact will result. If the first rapid cam rise is set to the available displacement of the buttons, the maximum operational range will be achieved.

The objective of the second rapid cam rise is to remove any remaining clearance between the friction material and the drag washer. Thus, the axial travel available due to this rise should be set equal to the height that the buttons protrude above the friction material. This value can be varied, for example, by setting the cam travel at a value greater than the ideal. This will result in the available drag force being increased throughout its reel's operational range. Conversely, setting the cam travel less than the ideal will result in a reduced drag force throughout the reel's operational range. Either way, it does not affect the operation of the strip drag position. So when the drag lever is thrown out of strip drag, the friction material makes contact with the drag washer and the reel operates in a normal fashion.

Figure 17:
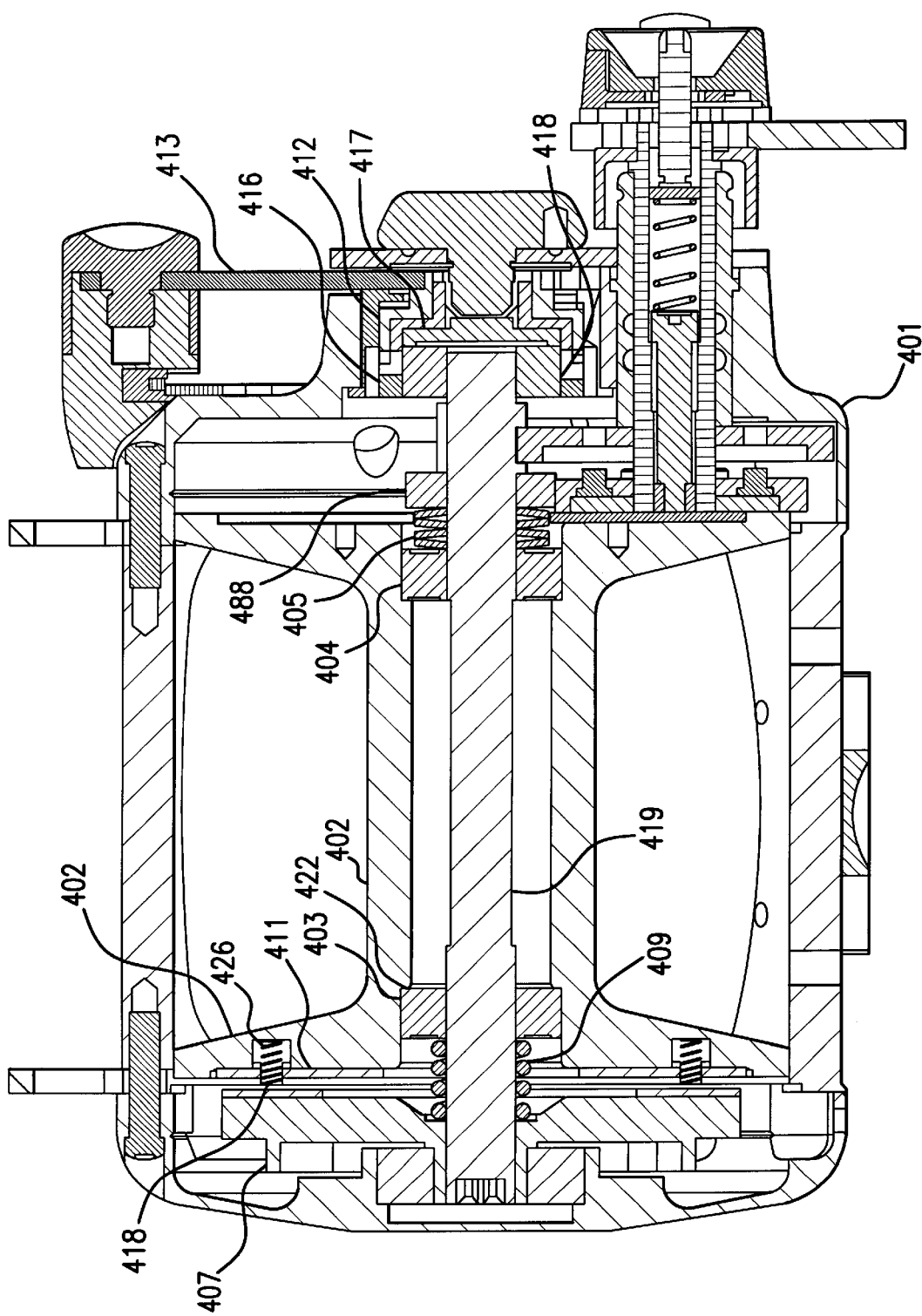
FIG. 17 is a sectional elevation view of the reel.

Referring to FIG. 17, in another alternate embodiment of my invention, there exists a side plate 401, which contains a cam mechanism 412. This cam is connected to a drag lever 413. The cam acts upon a cam follower 416, which contains a preset screw 417. A bearing 418 is radially supported in the side plate; axially supported by the preset screw. Within this bearing is journaled a pinion 419. This pinion is supported at the opposite end by a drive plate 407; which itself is supported by a bearing. On this pinion rides a spool 402, which is supported radially by two bearings 403 and 404. A drag washer 411 is fixedly attached to the flange of the spool. The left side spool bearing 403 is supported axially on one side by a shoulder 422 machined into the spool. A shoulder also locates the right side spool bearing axially. Between the right side spool bearing 404 and the pinion gear 488 reside the clutch springs 405. A clutch separation spring 409 is located between the left side spool bearing and the drive plate.

A series of spring loaded buttons 418 are arranged in the flange of the spool 402, such that they protrude through the surface of the drag washer 411, and can move axially against spring pressure exerted by secondary clutch springs 426 up to the point where their outermost surface can become flush with the working surface of the drag washer. This motion will be resisted by the springs 426.

The reel works as follows. When the preset is set to a minimal value, there exists clearance between the friction material and the buttons. When the drag lever is moved into the strip drag position, the buttons are brought into contact with the friction material. At this point, the axial loads on the drag members are due entirely to the secondary clutch springs. As can be seen, there is a range of preset settings in which the buttons will not be completely compressed against the friction material. This defines operational range of the strip drag position.

The maximum clearance between the friction material and the buttons that can be used while still retaining the strip drag operation is equal to the axial travel of the first rapid cam rise. This way, when the drag lever is moved to the strip drag position, contact will result. If the first rapid cam rise is set to the available displacement of the friction material, the maximum operational range will be achieved.

The objective of the second rapid cam rise is to remove any remaining clearance between the buttons and its drag washer. Thus, the axial travel available due to this rise should be set equal to the height that the buttons protrude above the surface of the drag washer. This value can be varied, for example, by setting the cam travel at a value greater than the ideal. This will result in the available drag force being increased throughout its reel's operational range. Conversely, setting the cam travel less than the ideal will result in a reduced drag force throughout the reel's operational range. Either way, it does not affect the operation of the strip drag position. So, as the drag lever is thrown out of strip drag, the friction material is pressed against the drag washer and the reel operates in a normal fashion.

What is claimed is:

1. In a fishing reel having a spool mounted for rotation about its axis and a drag means for imparting a drag on the rotation of said spool; said drag means comprising a cam means, a portion thereof being rotatable, said cam means having a working surface and a follower engaging said working surface to provide axial movement of a portion thereof upon rotation thereof within the reel to impart different degrees of drag on said spool; said working surface having portions thereof of different profiles; a first of said portions having a profile providing for a free spool condition imparting no drag to said spool; and a third of said portions having a profile providing for at least a full drag condition to said spool;

the improvement comprising: a second portion positioned between the first and third portions, and having a profile surface providing a strip drag condition which provides minimal drag on said spool, whereby when said cam means is moved from a position providing said third condition toward a position providing said first condition, the cam means will impart minimal drag to said spool in said second position before reaching said first position.

2. The reel of claim 1 wherein said spool has a plurality of shoulders and is mounted on first and second spool bearings; said first and second spool bearings being mounted on a pinion and positioned axially against said shoulders on the spool; said reel further comprising:
preset drag means including said cam means mounted on said reel and engaging said pinion to position said pinion axially in response to rotation said cam means; said reel further comprising:
outside and inside drive plates mounted in said reel, having surfaces juxtaposed to one another; said outside drive plate being fixedly mounted at one end of said reel; said inside drive plate being mounted for rotation with said spool;
a drag washer mounted in said reel and positioned between said drive plates; said drive plates having surfaces positioned for frictional engagement with said washer to impart said drag to said spool;
a gear mounted on said pinion;
clutch spring means mounted between said preset drag means and said gear on said pinion;
clutch separation spring means mounted between and engaging said first and second drive plates;
secondary clutch spring means mounted between said gear and a first of said spool bearings;
said clutch spring means being stronger that said clutch separation spring means;
said clutch separation spring means being stronger than said secondary clutch spring means;
all of the above described parts and means being so positioned and arranged that upon movement of said cam means from a first position in a free spool condition to a second position of strip drag condition, the clutch spring means travels axially and engages the pinion and the gear, which engages the secondary clutch spring means, pushing it against said first spool bearing and moving the spool axially, thereby moving the drag washer into engagement with the outside drive plate to impart minimal drag to said spool.

3. The reel of claim 2 wherein upon movement of said cam means from said second position to a third position of full drag condition, the clutch separation spring means compresses axially until the inside drive plate fully engages with the drag washer.

4. The reel of claim 2 wherein the secondary clutch spring coacts with the bearing to maintain clearance between the inside drive plate and the drag washer in the free spool condition.

5. The reel of claim 2 wherein a retaining means is mounted in said reel and engages said pinion to prevent axial movement thereof toward said preset drag means.

6. The reel of claim 5 wherein said reel further comprises a click means mounted therein.

7. The reel of claim 1 wherein said spool has a plurality of shoulders and is mounted on first and second spool bearings; said first and second spool bearings being mounted on a pinion; and a retaining means is provided retaining said second bearing axially against a shoulder on the spool; said reel further comprising:
preset drag means including said cam means mounted on said reel and engaging said pinion to position said pinion axially in response to rotation said cam means;
an outside drive plate fixedly mounted at one end of said reel;
a drag washer mounted in said reel for rotation with said spool; said outside drive plate having a surface positioned for frictional engagement with said washer to impart said drag to said spool;
a gear mounted on said pinion;
clutch spring means mounted between said first bearing and said gear on said pinion;
clutch separation spring means mounted between and engaging said outside drive plate and said second bearing;
a spacer sleeve mounted on said pinion between said first and second bearings;
secondary clutch spring means mounted between said second spool bearing and said spacer sleeve;
said clutch spring means being stronger than said clutch separation spring means;
said secondary clutch spring means being stronger that said clutch separation spring means;
all of the above described parts and means being so positioned and arranged that upon movement of said cam means from a first position in a free spool condition to a second position of strip drag condition, the preset means travels axially and engages the pinion and the gear, which engages said clutch spring means, pushing it against said first spool bearing which pushes against the spacer sleeve; which pushes against the secondary clutch springs;
which pushes against and moves the spool axially, thereby moving the drag washer into engagement with the outside drive plate to impart minimal drag to said spool.

8. The reel of claim 7 wherein upon movement of said cam means from said second position to a third position of full drag condition, the secondary clutch spring means compresses axially until the first spool bearing fully contacts the shoulder in the spool.

9. The reel of claim 1 wherein said spool has a plurality of shoulders and is mounted on first and second spool bearings; said first and second spool bearings being mounted on a pinion positioned axially against said shoulders on the spool; said reel further comprising:
preset drag means including said cam means mounted on said reel and engaging said pinion to position said pinion axially in response to rotation said cam means;
an outside drive plate fixedly mounted at one end of said reel;
a drag washer mounted in said reel for rotation with said spool; said outside drive plate having a surface positioned for frictional engagement with said washer to impart said drag to said spool;
a drag pin means having a plurality of drag pins mounted in said reel and positioned to extend said drag pins from said drag washer into the space between said drag washer and said outside drive plate; said outside drive plate having a surface positioned for frictional engagement with said plurality of drag pins to impart said drag to said spool;
a gear mounted on said pinion;
clutch spring means mounted between said first spool bearing and said gear on said pinion;
clutch separation spring means mounted between and engaging said outer drive plate and said second bearing;
said clutch spring means being stronger that said clutch separation spring means;
said clutch spring means being stronger than said secondary clutch spring means;

all of the above described parts and means being so positioned and arranged that upon movement of said cam means from a first position in a free spool condition to a second position of strip drag condition, the preset drag means travels axially and engages the pinion and thus the gear, which engages said clutch spring means, pushing it against the first spool bearing; which pushes against and moves the spool axially, thereby moving the drag pins into engagement with the outside drive plate to impart minimal drag to said spool.

10. The reel of claim 9 wherein upon movement of said cam means from said second position to a third position of full drag condition, the clutch separation spring means compresses axially until the drag washer fully engages with the outside drive plate.

11. The reel of claim 9 wherein the drag pin means comprises a plurality of pins mounted in said drag washer drive plate and spring loaded to extend from the surface thereof into the space between the plates and to contact the outer drive plate to impart minimal drag in the second position, and to yield to allow the plates to fully contact in the full drag condition.

12. The reel of claim 1 wherein said spool has a plurality of shoulders and is mounted on first and second spool bearings; said first and second spool bearings being mounted on a pinion and positioned axially against said shoulders on the spool; said reel further comprising:
 preset drag means including said cam means mounted on said reel and engaging said pinion to position said pinion axially in response to rotation said cam means;
 an outside drive plate fixedly mounted at one end of said reel;
 a drag washer mounted in said reel for rotation with said spool; said outside drive plate having a surface positioned for frictional engagement with said washer to impart said drag to said spool;
 a drag pin means having a plurality of drag pins mounted in said outer drive plate and positioned to extend into the space between said drive plate and drag washer; said drag washer having a surface positioned for frictional engagement with said drag pin means to impart said drag to said spool;
 clutch spring means mounted between said first spool bearing and said gear on said pinion;
 clutch separation spring means mounted between and engaging said outer drive plate and said second bearing;
 said clutch spring means being stronger that said clutch separation spring means;
 all of the above described parts and means being so positioned and arranged that upon movement of said cam means from a first position in a free spool condition to a second position of strip drag condition, the pinion travels axially and engages the clutch spring means which engages said first bearing and thus the spool, moving the spool axially, thereby moving the drag washer into engagement with the drag pin means to impart minimal drag to said spool.

13. The reel of claim 12 wherein upon movement of said cam means from said second position to a third position of full drag condition, the clutch separation spring means compresses axially until the drag washer fully engages with the outer drive plate.

14. The reel of claim 12 wherein the drag pin means comprises a plurality of pins mounted in said outside drive plate and spring loaded to extend from the surface thereof into the space between the plate and to contact the drag washer to impart minimal drag in the second position, and to yield to allow the plate and drag washer to fully contact in the full drag condition.

15. The reel of claim 1 wherein said spool has a plurality of shoulders and is mounted on first and second spool bearings; said first and second spool bearings being mounted on a pinion and retained axially against said shoulders on the spool; said reel further comprising:
 preset drag means including said cam means mounted on said reel and engaging said pinion to position said pinion axially in response to rotation said cam means;
 an outside drive plate fixedly mounted at one end of said reel;
 a drag washer mounted in said reel for rotation with said spool; said outside drive plate having a surface positioned for frictional engagement with said washer to impart drag to said spool;
 the outside drive plate having mounted thereto a friction washer having a friction surface juxtaposed to a surface of said drag washer;
 said drag washer having a surface positioned for frictional engagement with said friction surface to impart drag to said spool;
 said outside drive plate having secondary clutch spring means retained therein in engagement with the friction washer to force a portion of said friction washer into the space between the drag washer and the drive plate;
 clutch spring means mounted between said first spool bearing and said gear on said pinion;
 clutch separation spring means mounted between and engaging said outer drive plate and said second bearing;
 said clutch spring means being stronger that said clutch separation spring means;
 said clutch spring means being stronger that said secondary clutch spring means;
 all of the above described parts and means being so positioned and arranged that upon movement of said cam means from a first position in a free spool condition to a second position of strip drag condition, the pinion travels axially and engages the clutch spring means which engages the bearing and thus the spool, moving the spool axially, thereby moving the drag washer into engagement with the portion of the friction washer which is extending into the space between the drag washer and the drive plate to impart minimal drag to said spool.

16. The reel of claim 15 wherein upon movement of said cam means from sail second position to a third position of full drag condition, the clutch separation spring means compresses axially until the drag washer fully engages with the drive plate.

17. The reel of claim 15 wherein the secondary clutch spring means retained in said outside drive plate comprises a plurality of individual springs.

18. The reel of claim 15 wherein the secondary clutch spring means mounted in said outside drive plate are spring loaded to extend from the surface thereof and against the friction washer and force a portion thereof into the space between the drive plate and drag washer and into contact with the drag washer to impart minimal drag in the second position, and to yield to allow the drive plate and drag washer to fully contact in the full drag condition.

* * * * *